United States Patent [19]

Goldsmith et al.

[11] Patent Number: 5,221,484

[45] Date of Patent: * Jun. 22, 1993

[54] CATALYTIC FILTRATION DEVICE AND METHOD

[75] Inventors: Robert L. Goldsmith, Belmont; Bruce A. Bishop, Cambridge, both of Mass.

[73] Assignee: CeraMem Separations Limited Partnership, Waltham, Mass.

[*] Notice: The portion of the term of this patent subsequent to May 19, 2009 has been disclaimed.

[21] Appl. No.: 811,307

[22] Filed: Dec. 20, 1991

Related U.S. Application Data

[63] Continuation-in-part of Ser. No. 639,568, Jan. 10, 1991, Pat. No. 5,114,581.

[51] Int. Cl.$^5$ .............................................. B01D 61/00
[52] U.S. Cl. ........................... 210/650; 210/321.75; 210/506; 210/510.1; 55/16; 55/158; 423/213.2
[58] Field of Search ............... 210/650, 510.1, 500.27, 210/496, 490, 506, 333.01; 55/58, 97, 381, 524, DIG. 30, 16, 158; 423/213.2, 213.7

[56] References Cited

U.S. PATENT DOCUMENTS

| | | | |
|---|---|---|---|
| 3,904,551 | 9/1975 | Lundsager et al. | 423/213.2 |
| 4,220,633 | 9/1980 | Pirsh | 423/239 |
| 4,309,386 | 1/1982 | Pirsh | 422/177 |
| 4,329,162 | 5/1982 | Pitcher, Jr. | 210/510.1 |
| 4,364,760 | 12/1982 | Higuchi et al. | 210/510.1 |
| 4,364,761 | 12/1982 | Berg et al. | 210/510.1 |
| 4,415,342 | 11/1983 | Foss | 55/97 |
| 4,416,675 | 11/1983 | Montierth | 210/510.1 |
| 4,416,676 | 11/1983 | Montierth | 210/510.1 |
| 4,417,908 | 11/1983 | Pitcher, Jr. | 210/510.1 |
| 4,419,108 | 12/1983 | Frost et al. | 210/510.1 |
| 4,426,320 | 1/1984 | Ernest et al. | 210/510.1 |
| 4,428,758 | 1/1984 | Montierth | 210/510.1 |
| 4,793,980 | 12/1988 | Torobin | 55/58 |
| 4,900,517 | 2/1990 | Domesle et al. | 423/213.7 |
| 4,943,423 | 1/1991 | Goldsmith | 210/506 |
| 5,108,601 | 4/1992 | Goldsmith | 210/247 |
| 5,114,581 | 5/1992 | Goldsmith et al. | 210/650 |

OTHER PUBLICATIONS

The NEW Clean Air Act, A Guide to The Clean Air Program As Amended in 1990, John Quarles, William H. Lewis, Jr.

Simultaneous NO$_x$ and Particulate Control Using a Catalyst-Coated Fabric Filter, Greg F. Weber, Sumitra R. Ness, and Dennis L. Laudal.

Primary Examiner—Robert A. Dawson
Assistant Examiner—Ana M. Fortuna
Attorney, Agent, or Firm—Richard P. Crowley

[57] ABSTRACT

A catalytic filtration device for separating a particulate-containing feed stock into a filtrate and a particulate-containing filter cake, having a monolith of porous material containing a plurality of passageways extending longitudinally from an inlet end face to an outlet end face, having a plurality of plugs in the ends of the passageways at the inlet end face and at the outlet end face to prevent direct passage of the feed stock through the passageways from the inlet end face to the outlet end face; a microporous membrane selected to separate the feed stock into a filtrate and particulate-containing filter cake, the membrane applied to at least the wall surfaces of the passageways open at the inlet end face and of mean pore size smaller than the mean pore size of the porous material; the device regenerable by withdrawal of the filter cake from the inlet end face of the device; and a catalyst applied to the device for catalyzing a reaction in the filtrate as it passes through the device. The catalytic filtration device suitable for use for catalyzing a gas phase reaction. Methods for forming and using the catalytic filtration device.

28 Claims, 2 Drawing Sheets

CATALYTIC FILTRATION DEVICE AND METHOD

REFERENCE TO PRIOR APPLICATION

This application is a continuation-in-part of U.S. Ser. No. 07/639,568, entitled "Back-Flushable Filtration Device and Method of Forming and Using Same", filed Jan. 10, 1991, now U.S. Pat. No. 5,114,581 which is incorporated herein by reference.

BACKGROUND OF THE INVENTION

The invention disclosed in U.S. Ser. No. 07/639,568 relates to a particulate filter, regenerable by back-flushing, formed from a porous honeycomb monolith structure with selectively plugged passageways and a microporous membrane coating applied to the passageway surfaces. This continuation-in-part application further includes a catalyst coating within or on the filter, which becomes a catalytic filter, capable of reacting constituents in the filtrate fluid as it passes through the filter.

There are many heterogeneous catalysts and catalyst devices which are used to carry out a great number of chemical reactions. In the use of heterogeneous catalysis, the reaction rate for a catalyst device can be limited by the rate of bulk mass transfer of reactants to the catalyst surface or by the rate of pore diffusion of reactants within the pore structure of porous heterogeneous catalysts. Such limitations are widely described in the technical literature, for example in the books "The Role Of Diffusion In Catalysis", by C. N. Satterfield and T. K. Sherwood, published by Addison-Wesley Publishing Company (1963) and "Heterogeneous Catalysis In Practice", by C. N. Satterfield, published by McGraw-Hill Book Company (1980). The engineering design of heterogeneous catalytic reactors is frequently based on these limitations. New catalyst configurations which can reduce or perhaps even eliminate such mass transfer limitations would have substantial practical value.

In the field of catalytic filters, there are various devices which can simultaneously remove particulate matter and catalyze a reaction in the fluid being filtered. For example, G. F. Weber, et al., at the Energy and Environmental Research Center at the University of North Dakota have developed catalyst-coated fabrics suitable for filtration of coal combustion flue gas for particulate removal with simultaneous reduction of oxides of nitrogen contained in the flue gas ("Simultaneous $NO_x$ and Particulate Control Using A Catalyst-Coated Fabric Filter", American Society of Mechanical Engineers Paper 91-JPGC-FACT-2, presented at the International Power Generation Conference, Oct. 6–10, 1991, San Diego, Calif.). This device consists of fiberglass fabrics which are coated with vanadium oxide catalysts, which in the presence of added ammonia, efficiently remove particulates as a filter and reduce the oxides of nitrogen in the gas flowing through the fabric filter. This latter process is called selective catalytic reduction (SCR).

Similar fabric filter devices are disclosed by E. A. Pirsh U.S. Pat. Nos. 4,220,633 and 4,309,386.

One advantage of such catalyst coated filters is that two processes can be achieved in a single device. In the above instance, the processes are particulate removal and catalytic reduction of a gaseous contaminant.

A further advantage of such a catalytic filtration process is that particulate matter can be removed before the filtered fluid contacts the catalyst. In cases in which particulate matter poisons the catalyst, this prefiltration can prolong catalyst life. This can be important, for example, in SCR systems for reduction of oxides of nitrogen in combustion streams containing ash catalyst poisons.

Yet one further advantage of such a catalytic filter is that the reacting fluid flows through the catalyst coated filter in contrast to flowing over or around a catalyst coated support. For example, in a packed bed catalytic reactor, a reactant fluid flows through a packed bed of catalyst particles, and both bulk and pore diffusion limitations, as indicated above, can limit the reaction rate. A similar consideration holds for other catalytic reactor devices, such as monolith supported catalysts in which the reactant fluid flows through the passageways of a monolith support onto which a catalyst coating has been applied. For the catalytic filter, however, the reactant fluid flows through the pore structure of the catalyst, which is in fact the catalyst-coated filter. This flow configuration can greatly reduce or even eliminate bulk diffusion or pore diffusion limitations present in other more traditional catalytic reactors.

There are certain limitations of the catalytic fabric filters as embodied in the art described above. One is that the filter itself is not compact. Typical area/volume ratios for fabric bag filters are from four square feet per cubic foot (for a twelve inch diameter bag) to twelve square feet per cubic foot (for a four inch diameter bag). In contrast, the filter disclosed in U.S. Ser. No. 07/639,568 can have an area to volume ratio from about thirty square feet per cubic foot up to and greater than about one hundred seventy five square feet per cubic foot. Thus the filter of U.S. Ser. No. 07/639,568 has a compactness up to over forty-fold greater than that of typical fabric bag filters.

Another limitation of the prior art is that fabrics used in bag filters can have temperature limitations. Even filters produced from high temperature ceramic fibers can have such temperature limitations. In contrast the filter of U.S. Ser. No. 07/639,568 can be produced from high temperature ceramics. This can be an advantage when the reaction to be performed with the catalytic filter is at an elevated temperature.

Thus, the catalytic filter disclosed herein has the advantages of substantially eliminating diffusional limitations present in many heterogeneously catalyzed reactions, a very high compactness for a catalytic filter, and a capability for high temperature service.

The device of this invention has wide utility for filtration of gases and liquids while concurrently catalyzing a reaction within the filtered fluid. Applications of special importance are found in the field of air pollution control for combustion gases from which fly ash can be removed while simultaneously removing gaseous contaminants such as oxides of nitrogen, sulfur dioxide, and volatile organic vapors. Other applications for air pollution control and coal gasification exist in which it is desirable to remove particulate matter, followed by catalyzing a reaction of one or more gaseous species present. For example, oxidation processes to remove organic vapors from a variety of industrial sources may be used to remove a variety of air toxics enumerated in the 1990 Amendments to the Clean Air Act of 1970. The amendment identifies 189 air toxics, mainly organics, emitted by a variety of sources which must be controlled.

SUMMARY OF THE INVENTION

It is therefore an object of the invention to provide a new catalytic filter which can be employed for the filtration of particulates from a fluid and catalytic reaction of constituents in the fluid as it passes through the filter.

It is also an object of the invention to provide a new catalytic filter which has a large amount of surface area unit relative to the volume of the device.

It is a further object of this invention to provide a catalytic filter capable of operation at elevated temperatures.

A still further object is to provide a catalyst reactor in which mass transfer limitations associated with bulk gas mass transfer and pore diffusion are substantially reduced.

This invention results from the realization that the backflushable filtration device disclosed in U.S. Ser. No. 07/639,568 can be treated to apply a catalyst to the device so as to catalyze a reaction in the filtered fluid as it passes through the device.

This invention features a catalytic filtration device for separating a particulate-containing feed stock into a filtrate and a particulate-containing filter cake. The device is comprised of a monolith of porous material containing a plurality of passageways extending longitudinally from an inlet end face to an outlet end face, having a plurality of plugs in the ends of the passageways at the inlet end face and at the outlet end face to prevent direct passage of the feed stock through the passageways from the inlet end face to the outlet end face. A microporous membrane selected to separate the feed stock into a filtrate and particulate-containing filter cake is applied to at least the wall surfaces of the passageways open at the inlet end face and the membrane has a mean pore size smaller than the mean pore size of the porous material. The device is regenerable by withdrawal of the filter cake from the inlet end face of the device. A catalyst is applied to the device for catalyzing a reaction in the filtrate as it passes through the device.

In one embodiment the catalytic filtration device has the catalyst applied to the interstitial pore volume of the device. The catalyst in the interstitial pore volume of the device may be applied by impregnation of the filter with a solution of a catalyst precursor.

In another embodiment, the catalyst may be applied as a discrete layer of a high surface area particulate catalyst carrier support which is itself coated with the catalyst. The high surface area particulate catalyst carrier support may be applied to the downstream side of the monolith passageway walls. Alternatively, the high surface area particulate catalyst carrier support may be applied between the membrane coating and the monolith passageway walls.

In one embodiment the catalytic filtration device has a filtration surface area per unit volume greater than about thirty square feet per cubic foot.

In another embodiment the mean pore diameter of the membrane coating is from about 0.1 micron to 5 microns.

In yet another embodiment the catalytic filtration device may be regenerated by back-flushing with a fluid.

The catalytic filtration device is suitable for catalyzing a gas phase reaction. One gas phase reaction which may be catalyzed is the reduction of oxides of nitrogen. Another gas phase reaction which may be catalyzed is the oxidation of sulfur dioxide. Yet another gas phase reaction which may be catalyzed is the oxidation of volatile organic vapors.

In a preferred embodiment the monolith porous material is ceramic and the membrane coating applied thereto is also ceramic.

This invention also features a method for the preparation of a catalytic filtration device for separating a particulate-containing feed stock into a filtrate and a particulate-containing filter cake, comprising: providing a monolith of porous material containing a plurality of passageways extending longitudinally from an inlet end face to an outlet end face, having a plurality of plugs in the ends of the passageways at the inlet end face and at the outlet end face to prevent direct passage of the feed stock through the passageways from the inlet end face to the outlet end face; applying a microporous membrane selected to separate the feed stock into a filtrate and particulate-containing filter cake to at least the wall surfaces of the passageways open at the inlet end face and of mean pore size smaller than the mean pore size of the porous material; and applying a catalyst the device for catalyzing a reaction in the filtrate as it passes through the device.

The method for the preparation of a catalytic filtration device may include applying the catalyst within the interstitial pore volume of the device. This method may further include impregnating the filter with a solution of a catalyst precursor to form the catalyst.

The method for the preparation of a catalytic filtration device may include applying the catalyst as a discrete layer of a high surface area particulate catalyst carrier support which is itself coated with the catalyst. The high surface area particulate catalyst carrier support may be applied to the outlet side of the monolith passageway walls, or it may be applied between the membrane coating and the monolith passageway walls.

The invention also includes the catalytic filtration device prepared by any of the above methods.

The invention further includes a method for the filtration and catalytic reaction of a particulate-containing fluid feed stock, comprising: introducing a fluid feed stock into the inlet end passageways of the catalytic filtration device; filtering the fluid feed stock by the catalytic filter to provide a filtrate and a particulate-containing filter cake; catalyzing a reaction in the filtrate as the filtrate passes through the device; and regenerating the device by withdrawal of the filter cake from the inlet end face of the device.

This method for the filtration and catalytic reaction of a particulate-containing fluid feed may include introducing a gaseous feed stock as the fluid feed stock and catalyzing a reaction in the gaseous filtrate. The gas phase reaction may include the reduction of the oxides of nitrogen, the oxidation of sulfur dioxide, or the oxidation of organic vapors.

All of the above methods may further include back flushing the device periodically with a fluid to remove the filter cake.

DETAILED DESCRIPTION OF THE INVENTION

Figure 1:
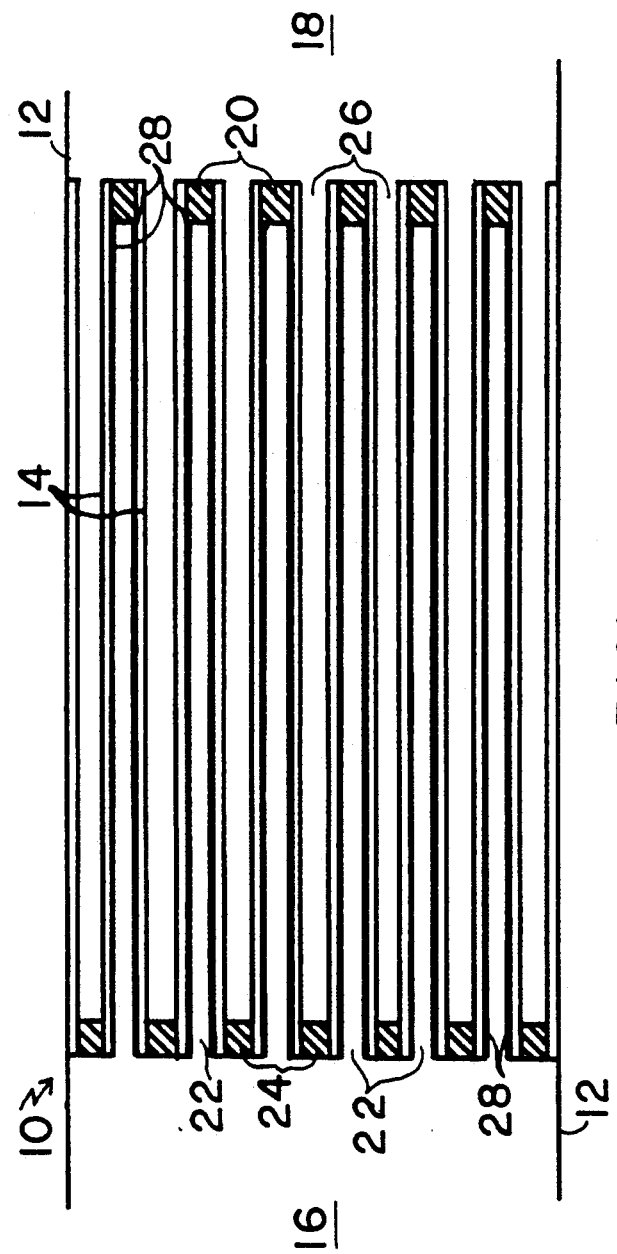
FIG. 1 shows a enlarged sectional view of a membrane-coated monolith filter structure along a plane parallel to an axis of the structure and perpendicular to the planes of the monolith end faces.

As shown in FIG. 1, the invention includes a porous monolith 10 in a housing 12 which contains a plurality of longitudinal passageways extending from an inlet end face 16 to an outlet end face 18 of the monolith. A filter body is formed from such a monolith by plugging alternate ends of adjacent passageways, with plugs 20 and 24, thereby creating inlet and outlet passageways 22 and 26 of the filter. This construction prevents direct passage of a feed stock through the passageways from the inlet end face to the outlet end face of the monolith through which filtrate is discharged.

A thin microporous membrane 28 is formed on the surfaces of the passageway walls 14 on at least the inlet passageways. The pore size of the membrane is smaller than that of the monolith material, and preferably less than that of the size of the particulate matter to be removed by the filter.

Figure 2:
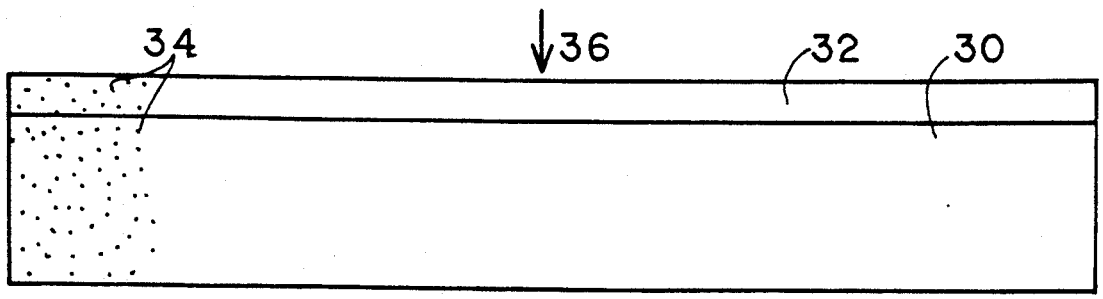
FIG. 2 shows an enlarged sectional view of a membrane-coated passageway wall of the filter with catalyst particles dispersed within and throughout the filter passageway wall and membrane coating.

In one embodiment the catalyst can be applied within the membrane-coated filter, i.e., in its interstitial pore volume. This can be achieved, for example, by impregnation of the filter with a solution of a catalyst precursor, followed by drying, calcining, and other possible treatments of a catalyst precursor material. The catalyst could also be applied within the interstitial pore volume by other techniques, such as chemical vapor deposition or plasma deposition. FIG. 2 shows an enlarged sectional view of a membrane-coated passageway wall which contains catalyst particles deposited within the interstitial pore volume. The monolith passageway wall 30 supports a membrane coating 32. Catalyst particles 34 are dispersed throughout the membrane-coated filter. Fluid being filtered 36 flows through the membrane coating and underlying passageway wall. After suspended particles are removed by the membrane coating, the filtered fluid or filtrate is brought into direct contact with the catalyst particles as the filtrate flows through the interstitial pore volume.

As an example of a method for depositing a catalyst, for a vanadium oxide catalyst suitable for oxides of nitrogen reduction, the filter can be impregnated with a solution of ammonium metavanadate. After drying and calcining, the vanadium oxide catalyst will be distributed through the pores of the monolith filter support and its membrane coating. Other additives to the impregnation solution, such as a titanium, tungsten, and molybdenum salts, can be added as catalyst stabilizers or promoters.

For a noble metal catalyst, for example platinum, the precursor can be a solution of a salt, such as chloroplatinic acid, which after drying, calcining, and reducing with hydrogen yields a dispersed platinum metal catalyst. Similarly, for a palladium catalyst, a palladium chloride solution can be used for impregnation. Analogous metallic salts can be used to impregnate the filter with precursors for other metal catalysts, or mixtures thereof After calcination, the deposited oxides can be reduced to yield the dispersed metal catalyst.

Figure 3:
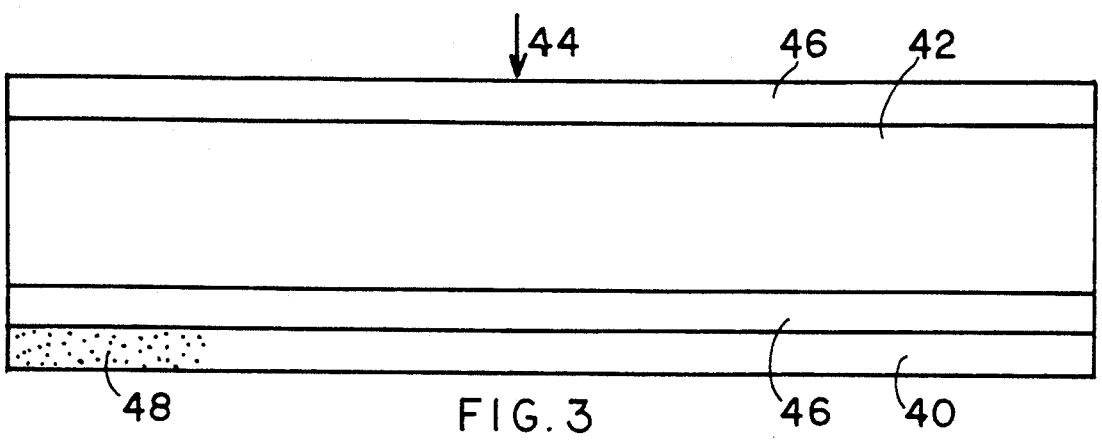
FIG. 3 shows an enlarged sectional view of a membrane coated passageway wall of the filter further coated on the downstream side with a catalyst coating comprised of a high surface area particulate catalyst carrier, itself coated with catalyst.

As an alternative to direct impregnation of the membrane-coated filter, the catalyst can be applied as a discrete layer of a high surface area particulate catalyst carrier support which itself is impregnated with the catalyst precursor or catalyst. FIG. 3 shows such a layer 40 applied to the downstream side of the monolith passageway wall 42. Fluid feed flow 44 flows through the membrane coating 46, in this example applied to both sides of the passageway wall, through the passageway wall 42, and the catalyst coating layer 40.

The particulate carrier coating can be applied by the same methods which can be used to apply a membrane coating. The particulate carrier coating is normally stabilized by a thermal treatment to bond the carrier particles. The active catalyst can be applied to the particulate carrier, by methods described above for direct application to a membrane-coated filter, either before or after the carrier is applied to the filter. If the active catalyst is applied after the particulate carrier is bonded to the filter, the active catalyst particles can be dispersed throughout the device.

The advantages of using a second carrier coating for the catalyst relate to surface area of the active catalyst. Both the porous monolith support and, normally, the membrane coating will have a relatively low surface area. Thus, if a catalyst coating is applied directly, by solution impregnation, the resulting surface area of the active catalyst may be low. Alternatively, if the catalyst coating consists of a high surface area particulate carrier support onto which the active catalyst is applied, the resulting surface area of the active catalyst material can be larger than that achieved by impregnation of a low surface area membrane-coated filter. In principle, it is possible to make a membrane coating from high surface area membrane particulate precursors which can also serve as a catalyst carrier. However, the principal function of the membrane coating is to have a uniform and controlled pore size so as to effectively retain particles in the fluid to be filtered. It is less limiting in choice of membrane forming materials to have the separate catalyst coating which can be prepared without concern about interstitial pore size distribution.

Figure 4:
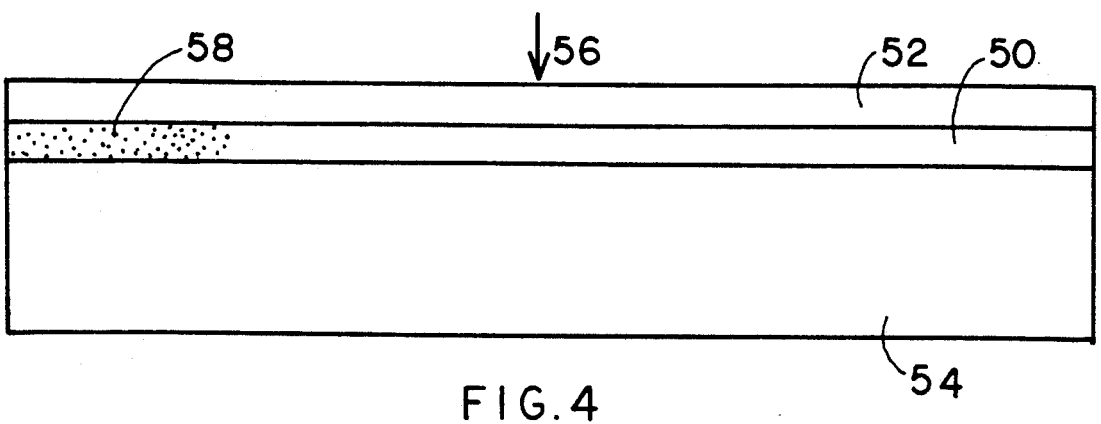
FIG. 4 shows an enlarged sectional view of a membrane coated passageway wall of the filter with a catalyst coating comprised of a high surface area particulate catalyst carrier, itself coated with catalyst, applied between the membrane and the passageway wall.

In another embodiment, the catalyst can be applied as a catalyst-impregnated carrier coating located between the membrane coating and the passageway wall of the monolith filter support on the inlet passageway side, as shown in FIG. 4. The separate catalyst layer 50 is deposited before applying the membrane coating 52 to the monolith passageway wall 54. Feed fluid 56 is thereby constrained to flow first through the membrane coating, then the discrete catalyst carrier layer, and finally through the passageway wall. The catalyst carrier coating with overlying membrane coating can be applied to either the feed side or the filtrate side of the passageway wall.

Such separate catalyst carrier coatings and membrane coatings can be applied in various combinations to either or both of the inlet and outlet monolith passageways in one or more layers. The catalyst carrier coating can be applied either beneath or on top of the membrane coating on either or both sides of the monolith passageway walls. If the separate catalyst carrier coating is applied directly to a porous monolith, some of the carrier material may penetrate into the pore structure of the monolith porous material. In this instance, the applied catalyst coated thereon together with the carrier may lie within the monolith pore structure.

As disclosed in U.S. Ser. No. 07/639,568, the porous monolith can be formed from a variety of porous materials, including ceramics, glass-bonded ceramics, glasses, sintered metals, cermets, resins or organic polymers, papers or textile fabrics, and various combinations thereof. Among ceramics are included cordierite, alumina, silica, mullite, zirconia, titania, spinel, silicon carbide, silicon nitride, and mixtures thereof. These ceramic materials may also be used in monoliths in which the ceramic materials are bonded with a glass.

In order to have a suitably high hydraulic permeability, the mean pore diameter of the monolith material should be greater than about 5 microns, and the porosity of the material should be greater than about 40 volume percent.

The plugs used to seal the alternate ends of the adjacent passageways can be polymeric or inorganic, and are normally selected to have good adhesion and chemical and thermal compatibility with the monolith material.

The membrane coating can be formed from a Variety of materials, including polymeric membranes and inorganic membranes. Inorganic materials which can be used include sintered metals and ceramic membranes. Ceramic membranes can include alumina, zirconia, titania, silica, zircon, cordierite, mullite, spinel, silicon carbide, silicon nitride, and mixtures thereof, bonded by thermal sintering or with a reactive inorganic binder.

Mean pore diameter of the membrane coating is preferably in the range of from about 0.1 micron to 5 microns. The thickness of the membrane coating should be as thin as possible so as to minimize the hydraulic resistance of the membrane coating, preferably less than 100 microns.

The membrane coating may be applied only to the inlet passageways, or alternately, it may be applied to both inlet and outlet passageways. If applied to both sets of passageways, the clean filter resistance to flow is increased. However, a membrane coating on the outlet passageways prevents possible plugging of the monolith material by particulate matter which may be present in a back-flushing fluid.

The membrane coating may be applied by several techniques, such as by viscous coating, filtration, and slip casting. Viscous coating is useful for coating of polymeric membranes. Filtration and slip casting may be used to apply coatings of ceramic or metal powders, which are subsequently stabilized and made strongly coherent and adherent to the passageway walls by thermal sintering, chemical reaction bonding, or other bonding techniques.

The catalyst can be applied to a membrane coated monolith filter support by impregnation with a solution containing a soluble catalyst precursor. After drying and calcining to decompose the precursor material, and possibly including a chemical reduction step, the catalyst will be dispersed throughout the monolith support and its membrane coating.

For the membrane coating, it is important that the pore structure be largely free of defects, such as cracks, or large pores which can allow particulate matter to pass through the filter. A coating of a catalyst impregnated particulate carrier can have defects and large pores as it does not serve as a particulate removal barrier. Any such pores or defects, however, should not lead to unacceptable channeling of process fluid, which will not occur if the major resistance to filtrate flow is other than in the catalyst coating.

There are many catalysts which can be used, depending on the fluid phase reaction to be catalyzed. Catalysts can be metals or metal mixtures, including the noble metals platinum, palladium, rhodium, ruthenium, and mixtures thereof, or other metals such as copper, nickel, and silver. The catalyst can be comprised of an oxide or oxide mixtures, including oxides of aluminum, cerium, chromium, cobalt, copper, iron, magnesium, manganese, molybdenum, nickel, potassium, titanium, tungsten, vanadium, zinc, as well as alumina silicate zeolites.

The high surface area particulate carrier support can be a porous alumina, silica, activated carbon, titania, or other porous catalyst support material. The porous support layer can be applied by the techniques used to coat inorganic membranes, as disclosed in U.S. Pat. No. 4,983,423, which is incorporated by reference herein.

The filter may be used to filter either a gaseous or liquid feed stock. There are several gas phase applications in which the membrane coated, catalyst filter can find use. These include, for example, the filtration of combustion flue gas in which fly ash is removed by filtration and gaseous contaminants are reacted as they pass through the filter. Such contaminants can include oxides of nitrogen which can be reduced to nitrogen and water vapor, sulfur dioxide which can be oxidized to sulfur trioxide, and unburned organic vapors which can be oxidized to carbon dioxide and water vapor. There are filtration applications in coal gasification processes where it is desirable to remove particulate ash and to react contaminants in the process gas stream. There are many industrial processes in which an exhaust gas contains both fine particulate matter and organic vapor contaminants which can be removed simultaneously by filtration and oxidation.

The filter may be regenerated, i.e. particulate matter removed, by back-flushing with a fluid normally free of particulate matter. In many instances, the fluid used for back-flushing can be filtrate produced from the feed stock. In some instances, the filter can be regenerated by mounting in an upflow orientation and removing the particulate matter by vibration, rapping, or other mechanical means.

EXAMPLE 1

The substrate for the catalyst coating was a ceramic membrane-coated monolith. The monolith was a cylinder 1" in diameter and 2" long. The monolith contained a multiplicity of parallel passageways extending from one end to the opposite end. The passageway configuration was square with 100 cells per square inch. The passageway dimension was 0.083" and the passageway wall thickness was 0.017". The monolith material was EX47 cordierite (Corning, Inc.) with a mean pore size of 12 microns and a porosity of 50%.

The monolith was coated in accordance with the methods taught in U.S. Pat. No. 4,983,423 with the ceramic membrane described in U.S. patent application Ser. No. 07/639,568.

The membrane-coated monolith was saturated with a solution of catalyst precursor. This solution contained 150 milliliters of water filtered with a 50,000 molecular weight cut-off ultrafiltration membrane and 10.5 grams of ammonium Vanadate (Aldrich Chemical Co., 99% $NH_4VO_3$). This is slightly above the solubility limit at 96° C. (6.95 grams per 100 milliliters of water) so as to ensure a saturated solution. The solution was formed by heating the stirred components for approximately 2 hours to about 96° C.

Next, the hot saturated solution was held without stirring to allow undissolved salt to settle, and the coated monolith, which had been heated to 90–95° C., was immersed in the hot supernatant vanadate solution for 6.5 minutes.

The saturated monolith was then withdrawn from the solution and immediately immersed in a glass beaker containing 250 milliliters of 3° C. isopropanol (2-Propanol, Aldrich Chemical Co., 99%+, A.C.S. Reagent Grade) which was cooled in an ice water bath. Quenching was used to precipitate the vanadate within the monolith structure due to the decreased solubility at low temperature (0.52 grams per 100 milliliters of water at 15° C.). Isopropanol was used because it is miscible with water but not a solvent for ammonium metavanadate. As a result, a solvent exchange between the alcohol and water takes place within the monolith while keeping the vanadate in the precipitated form. This allows the monolith to be dried easily at room temperature. If thermal drying of the coated monolith were attempted with water in the pore volume, the vanadate could redissolve and migrate with the drying front as water was removed from the monolith. During quenching, a small amount of yellowish precipitate formed in the isopropanol. The coated monolith remained in the alcohol for about one minute during which the temperature rose only slightly.

The coated monolith was then removed, placed on a paper towel, and allowed to dry for several minutes. Little vanadate was extracted by the paper towel. The monolith had a slight yellowish color.

After storage in a closed container for 3 days, the sample was heated in air to 400° C. at a rate of about 2° C. per minute in a resistively heated kiln. After reaching temperature, the kiln was turned off and allowed to cool overnight. After firing, the monolith had turned a uniform dark reddish orange color indicative of vanadium pentoxide. Weight uptake due to the fired impregnant was about 18 milligrams of vanadia per gram of membrane-coated monolith. This corresponds to a catalyst volume of about 1 to 2 percent of the monolith pore volume.

The monolith passageways were then plugged with a low temperature setting cement (Adhesive No. 919, Cotronics Corp.) so as to form a dead-ended filter which was then tested for gas flow/pressure drop characteristics. The plugging and pressure drop measurement were performed according to the procedures taught in U.S. patent application Ser. No. 07/639,568. The internal filter surface area after plugging was about 0.06 square feet.

The measured pressure drop of the filter was about 5 inches of water column at 10 cubic feet per hour nitrogen gas flow which corresponds to about 2.8 feet per minute face velocity. This pressure drop was not measurably different from the pressure drop for a membrane coated filter sample without the catalyst applied.

The catalyst impregnated filter was used in a test as a device for selective catalytic reduction of oxides of nitrogen. The catalytic filter sample was installed in a test apparatus in which a mixture of 600 ppm NO in air was passed through the sample at 380° C., with $NH_3$ addition at a molar ratio of $NH_3$ to NO of 1:1, and a gas flow rate of 1 std liter/minute. This corresponds to a space velocity (SV) at standard temperature and pressure (STP) of about 2300 $hr^{-1}$ or filter face velocity of about 1.3 ft/min.

The removal of NO by selective catalytic reduction was measured to be about 70%. However, it was determined subsequently that a portion of the $NH_3$ was removed by background reactions in the test system. Accordingly, the degree of removal of NO may have been limited by the amount of $NH_3$ reactant present, not by other limitations.

EXAMPLE 2

A second membrane-coated filter, with membrane coatings on both inlet and outlet passageway walls, was prepared as in Example 1. This membrane-coated filter was further coated by a catalyst manufacturer with a discrete layer of a high surface area particulate catalyst carrier support which itself was impregnated with a proprietary $NO_x$ reduction catalyst. This layer was applied to the outlet passageway wall surfaces on top of the membrane coating. The catalytic filter so prepared was tested for NO reduction. Test conditions were 400 ppm NO in air at 400° C., an $NH_3$ slip (unreacted $NH_3$ in product gas) of 10 ppm, and a space velocity of 14,000 $hr^{-1}$ at STP. Greater than 85% NO removal was measured.

Although specific features of the invention are shown in some drawings and not others, and described in various embodiments, this is for convenience only as each feature may be combined with any or all of the other features in accordance with the invention. Other embodiments will occur to those skilled in the art and are within the following claims:

What is claimed is:

1. A catalytic filtration device for separating a particulate-containing feed stock into a filtrate and a particulate-containing filter cake, which device comprises
a monolith of porous material containing a plurality of passageways extending longitudinally from an inlet end face to an outlet end face, having a plurality of plugs in the ends of the passageways at the inlet end face and at the outlet end face to prevent direct passage of the feed stock through the passageways from the inlet end face to the outlet end face;
a microporous membrane selected to separate the feed stock into a filtrate and particulate-containing filter cake, the membrane applied to at least the wall surfaces of the passageways open at the inlet end face and of mean pore size smaller than the mean pore size of the porous material;
the device regenerable by withdrawal of the filter cake from the inlet end face of the device; and
a catalyst applied to the device for catalyzing a reaction in the filtrate as it passes through the device.

2. The catalytic filtration device of claim 1 in which the catalyst is applied within the interstitial pore volume of the device.

3. The catalytic filtration device of claim 2 in which the catalyst is applied by impregnation of the filter with a solution of a catalyst precursor.

4. The catalytic filtration device of claim 1 in which the catalyst is applied as a discrete layer of a high surface area particulate catalyst carrier support which is itself coated with the catalyst.

5. The catalytic filtration device of claim 4 in which the high surface area particulate catalyst carrier support is applied to the outlet side of the monolith passageway walls.

6. The catalytic filtration device of claim 4 in which the high surface area particulate catalyst carrier support is applied between the membrane coating and the monolith passageway walls.

7. The catalytic filtration device of claim 1 in which the filtration surface area per unit volume is greater than about thirty square feet per cubic foot.

8. The catalytic filtration device of claim 1 in which the mean pore diameter of the membrane coating is from about 0.1 micron to 5 microns.

9. The catalytic filtration device of claim 1 in which the device may be regenerated by back-flushing with a fluid.

10. The catalytic filtration device of claim 1 in which the feed stock is a gas and the catalyst is suitable for catalyzing a gas phase reaction.

11. The catalytic filtration device of claim 10 in which the catalyst is suitable for reduction of oxides of nitrogen.

12. The catalytic filtration device of claim 10 in which the catalyst is suitable for oxidation of sulfur dioxide.

13. The catalytic filtration device of claim 10 in which the catalyst is suitable for oxidation of organic vapors.

14. A catalytic filtration device for separating a particulate-containing feed stock into a filtrate and a particulate-containing filter cake, which device comprises a monolith of porous ceramic material containing a plurality of passageways extending longitudinally from an inlet end face to an outlet end face, having a plurality of plugs in the ends of the passageways at the inlet end face and at the outlet end face to prevent direct passage of the feed stock through the passageways from the inlet end face to the outlet end face;

a microporous ceramic membrane selected to separate the feed stock into a filtrate and particulate-containing filter cake, the membrane applied to at least the wall surfaces of the passageways open at the inlet end face and of mean pore diameter from about 0.1 micron to 5 microns;

the device regenerable by withdrawal of the filter cake from the inlet end face of the device; and a catalyst applied to the device for catalyzing a reaction in the filtrate as it passes through the device.

15. The catalytic filtration device of claim 14 in which the feed stock is a gas and the catalyst is suitable for catalyzing a gas phase reaction.

16. A method for the preparation of a catalytic filtration device for separating a particulate-containing feed stock into a filtrate and a particulate-containing filter cake, which method comprises providing a monolith of porous material containing a plurality of passageways extending longitudinally from an inlet end face to an outlet end face, having a plurality of plugs in the ends of the passageways at the inlet end face and at the outlet end face to prevent direct passage of the feed stock through the passageways from the inlet end face to the outlet end face;

applying a microporous membrane selected to separate the feed stock into a filtrate and particulate-containing filter cake to at least the wall surfaces of the passageways open at the inlet end face and of mean pore size smaller than the mean pore size of the porous material; and applying a catalyst to the device for catalyzing a reaction in the filtrate as it passes through the device.

17. The method of claim 16 which includes applying the catalyst within the interstitial pore volume of the device.

18. The method of claim 17 which includes impregnating the filter with a solution of a catalyst precursor to form the catalyst.

19. The method of claim 16 which includes applying the catalyst as a discrete layer of a high surface area particulate catalyst carrier support which is itself coated with the catalyst.

20. The method of claim 19 which includes applying the high surface area particulate catalyst carrier support to the outlet side of the monolith passageway walls.

21. The method of claim 19 which includes applying the high surface area particulate catalyst carrier support between the membrane coating and the monolith passageway walls.

22. The catalytic filtration device prepared by the method of claim 16.

23. A method for the filtration and catalytic reaction of a particulate-containing fluid feed stock which method comprises providing a catalytic filtration device, which device comprises a monolith of porous material containing a plurality of passageways extending longitudinally from an inlet end face to an outlet end face, having a plurality of plugs at the ends of the passageways at the inlet end face and at the outlet end face to prevent direct passage of the feed stock through the passageways from the inlet end face to the outlet end face;

a microporous membrane selected to separate the feed stock into a filtrate and particulate-containing filter cake, the membrane applied to at least the wall surfaces of the passageways open at the inlet end face and of mean pore size smaller than the mean pore size of the porous material;

a catalyst applied to the device for catalyzing a reaction in the filtrate as its passes through the device;

introducing a fluid feed stock into the inlet end passageways of the catalytic filtration device;

filtering the fluid feed stock by the device to provide a filtrate and a particulate-containing filter cake;

catalyzing a reaction in the filtrate as the filtrate passes through the device;

and regenerating the device by withdrawal of the filter cake from the inlet end face of the device.

24. The method of claim 23 which includes introducing a gaseous feed stock as the fluid feed stock and catalyzing a reaction in the gaseous filtrate.

25. The method of claim 24 which includes introducing a gaseous feed stock containing oxides of nitrogen and reducing by catalytic reaction the oxides of nitrogen in the gaseous filtrate.

26. The method of claim 24 which includes introducing a gaseous feed stock containing sulfur dioxide and oxidizing by catalytic reaction the sulfur dioxide in the gaseous filtrate.

27. The method of claim 24 which includes introducing a gaseous feed stock containing organic vapors and oxidizing by catalytic reaction the organic vapors in the gaseous filtrate.

28. The method of claim 23 which includes back flushing the device periodically with a fluid to remove the filter cake.

* * * * *